(12) United States Patent
Rossi et al.

(10) Patent No.: US 9,381,994 B2
(45) Date of Patent: Jul. 5, 2016

(54) AEROFOIL PORTION OF AN AIRCRAFT COMPRISING AN ATTACHMENT SUPPORT OF A CONNECTING DEVICE MOUNTED IN TRANSLATION

(71) Applicant: Airbus Operations (S.A.S.), Toulouse (FR)

(72) Inventors: Frédéric Rossi, Lartigue (FR); Laurent Alcala, Cagardelle sur Ceze (FR)

(73) Assignee: Airbus Operations (S.A.S.), Toulouse (FR)

( * ) Notice: Subject to any disclaimer, the term of this patent is extended or adjusted under 35 U.S.C. 154(b) by 45 days.

(21) Appl. No.: 14/565,173

(22) Filed: Dec. 9, 2014

(65) Prior Publication Data
US 2015/0183507 A1 Jul. 2, 2015

(30) Foreign Application Priority Data
Dec. 11, 2013 (FR) ...................................... 13 62424

(51) Int. Cl.
*B64D 27/26* (2006.01)
*B64C 3/32* (2006.01)
*B64D 37/00* (2006.01)
*B64C 1/40* (2006.01)

(52) U.S. Cl.
CPC . *B64C 3/32* (2013.01); *B64D 27/26* (2013.01); *B64D 37/005* (2013.01); *B64C 1/406* (2013.01); *B64D 2027/262* (2013.01)

(58) Field of Classification Search
CPC ............ B64D 27/26; B64D 2027/262; B64D 37/005; B64C 3/32; B64C 1/406; F16L 33/025; F16L 37/00
See application file for complete search history.

(56) References Cited

U.S. PATENT DOCUMENTS

| 6,607,165 | B1 | 8/2003 | Manteiga et al. |
| 7,837,144 | B2 * | 11/2010 | Kothera ..................... B64C 3/48 |
| | | | 244/99.2 |
| 8,851,417 | B2 * | 10/2014 | Sandy .................... B64D 27/26 |
| | | | 244/54 |
| 2005/0211847 | A1 | 9/2005 | Pattie et al. |
| 2006/0272848 | A1 | 12/2006 | Guthke et al. |
| 2009/0020647 | A1 | 1/2009 | Porte |

FOREIGN PATENT DOCUMENTS

| FR | 2 918 724 | 1/2009 |
| FR | 2 987 401 | 8/2013 |

OTHER PUBLICATIONS

French Search Report for Application No. 13 62424 dated Sep. 9, 2014.

* cited by examiner

*Primary Examiner* — Tien Dinh
*Assistant Examiner* — Richard R Green
(74) *Attorney, Agent, or Firm* — Jenkins, Wilson, Taylor & Hunt, P.A.

(57) ABSTRACT

In the context of the wings of aircraft, the ability to compensate for variations in movement and to absorb assembly tolerances, and flexibility for mounting, are all desired. An object of the disclosure thus relates to a wing portion of an aircraft, having a connecting device between a rigid structure and a flexible structure, the connecting device being attached to a structural element of the wing portion via the intermediary of an attachment support, wherein the attachment support is mounted in translation on the structural element by at least one translation spindle. The disclosure is applicable in the field of aeronautics, in particular for the hydraulic equipment of an aircraft.

11 Claims, 3 Drawing Sheets

AEROFOIL PORTION OF AN AIRCRAFT COMPRISING AN ATTACHMENT SUPPORT OF A CONNECTING DEVICE MOUNTED IN TRANSLATION

CROSS-REFERENCE TO RELATED APPLICATION

This application claims priority to French Patent Application No. 13 62424 filed on Dec. 11, 2013, the entire disclosure of which is incorporated by reference herein.

TECHNICAL FIELD

The present disclosure relates to the field of wings of aircraft, and more particularly to the attachment, on the wings of aircraft, of devices connecting a rigid structure and a flexible structure.

More specifically, the present disclosure relates to an aircraft wing portion comprising a support for attaching, to the wing portion, a connecting device between flexible and rigid structures, and an engine assembly for an aircraft.

The disclosure relates particularly to attachment pylons for jet engines of aircraft. This type of attachment pylon, also called EMS (for Engine Mounting Structure), makes it possible to hang the jet engine beneath the wing of the aircraft, or to mount this jet engine above this same wing.

BACKGROUND

An attachment pylon is provided so as to constitute the connection interface between a jet engine and a wing of the aircraft. It makes it possible to transmit, to the structure of this aircraft, the forces generated by its associated jet engine, and also allows fuel, electrical systems, hydraulic systems and air to be routed between the engine and the aircraft.

In order to transmit the forces, the pylon comprises a rigid structure, also termed the primary structure, frequently of the box type, that is to say formed by assembling upper and lower spars which are connected to one another via the intermediary of transverse ribs, wherein lateral panels may also be provided.

On the other hand, the pylon is fitted with a mounting system interposed between the jet engine and the rigid structure of the pylon, this system comprising, overall, at least two engine attachments, generally at least one forward attachment and at least one rear attachment.

Moreover, the mounting system comprises a device for taking up the thrust forces generated by the jet engine. This device may for example take the form of two lateral struts which are connected on one hand to a rear portion of the fan casing of the jet engine, and on the other hand to a rear attachment which is attached to the central casing of the latter.

In the same way, the attachment pylon also comprises a second mounting system interposed between the rigid structure of this pylon and the wing of the aircraft, wherein this second system, also called the attachment structure for attaching the pylon to the wing, usually comprises two or three attachments.

Finally, the pylon is provided with a rear secondary structure which separates and holds the systems while supporting aerodynamic fairings.

The rear secondary structure may in particular permit the installation of part of the hydraulic systems, and in particular the installation of components for hydraulic power generation. Thus, numerous hydraulic ducts may be located within this region of the attachment pylon which, this region being very narrow, requires the provision of straight ducts.

Moreover, these components for hydraulic power generation are also secured to the lower surface of the wing associated with the attachment pylon.

This placement in the rear secondary structure and this principle for attachment on the wing of the components for hydraulic power generation merit providing providing "flexibility" to the components for hydraulic power generation, so as to be able in particular to absorb the assembly tolerances and the relative movement, during flight, between the wing and the attachment pylon, that is to say more precisely the difference in thermal expansion since, during flight, the surface of the wing and the fuel therein are cold whereas the attachment pylon of the jet engine and the hydraulic ducts therein are at a higher temperature.

To that end, it is known to use sliding union connectors, and in particular low-pressure sliding union connectors, installed in line on the hydraulic ducts of the attachment pylon, and in particular on the hydraulic fluid aspiration duct located in the rear secondary structure. Such sliding union connectors thus aim to provide the ducts with the desired flexibility such that it is possible to compensate for the variations in movement between the wing and the rear secondary structure.

FIG. 1 represents, schematically and partially, in perspective, an example of an attachment pylon 20 for a jet engine of an aircraft. As this type of attachment pylon 20 is well known to a person skilled in the art, only a partial description thereof is given.

The attachment pylon 20 thus comprises a rear secondary structure 21 accommodating part of the hydraulic systems of the pylon 20, and in particular components for hydraulic power generation 22. In particular, a hydraulic fluid aspiration duct 11, of straight overall architecture so as to fit the space available in the rear secondary structure 21, is located inside this rear secondary structure 21.

FIG. 2 is an enlarged view of region A of FIG. 1. This FIG. 2 shows that the aspiration duct 11 extends between a first attachment point P1 and a second attachment point P2, which are both fixed relative to the structure of the wing. Moreover, at the second attachment point P2 there is located a fire shut-off valve 13, in particular a low-pressure fire shut-off valve 13 which, in an open position, allows the hydraulic fluid to circulate in the aspiration duct 11 and, in a closed position, prevents the hydraulic fluid from circulating in the aspiration duct 11.

In order to be able to compensate for the variations in movement between the wing and the rear secondary structure 21 of the attachment pylon 20, which may appear most particularly as a consequence of thermal expansion, there is provided a sliding union connector 12 mounted in line on the aspiration duct 11. The sliding allowed thereby may provide the desired flexibility for the aspiration duct 11.

Nonetheless, this solution which depends on the use of sliding union connectors is not entirely satisfactory.

Indeed, sliding union connectors may originate large leaks of hydraulic fluid, which are not permissible. Such leaks may then lead to repeated maintenance work to replace the sliding union connectors. However, replacing a sliding union connector requires very specific technical skills and is also time-consuming.

SUMMARY

There is therefore a need to conceive a solution which is able to provide flexibility to the mounting of a connecting device between a rigid structure and a flexible structure on the wing of an aircraft.

There is in particular a need to propose an alternative solution on the hydraulic systems of an aircraft jet engine attachment pylon, and in particular on the components for hydraulic power generation of the rear secondary structure of the pylon, so as to compensate for the variations in movement which can appear between the wing and the pylon, and so as to absorb the assembly tolerances.

An object of the disclosure is to at least partially satisfy the requirements mentioned hereinabove and the drawbacks relating to the embodiments of the prior art.

The disclosure thus relates, according to one of its aspects, to a wing portion of an aircraft, comprising a connecting device between a rigid structure and a flexible structure, the connecting device being attached to a structural element of the wing portion via the intermediary of an attachment support, wherein the attachment support is mounted in translation on the structural element by at least one translation spindle.

By virtue of the disclosure, it is possible to provide flexibility to a connecting device between a rigid structure and a flexible structure of an aircraft wing, by an attachment support mounted such that it can move relative to the wing. In this manner, it possible to absorb assembly tolerances and to compensate for variations in movement which may appear between the connecting device and the wing.

The wing portion according to the disclosure may furthermore comprise one or more of the following features, considered in isolation or in all technically possible combinations.

The attachment support may be mounted in translation on a retaining arm of the structural element of the wing portion.

At least one of the attachment support and the retaining arm may be mounted in a sliding manner on the at least one translation spindle.

The attachment support may be attached non-removably to the at least one translation spindle. The assembly thus formed by the attachment support and the at least one translation spindle may be able to slide with respect to the retaining arm. In other words, in this case, the retaining arm is mounted in a sliding manner on the at least one translation spindle. An endstop, for example washers, may be provided on the at least one translation spindle so as to limit the travel of the retaining arm.

The retaining arm may be attached non-removably to the at least one translation spindle. The assembly thus formed by the retaining arm and the at least one translation spindle may be able to slide with respect to the attachment support. In other words, in this case, the attachment support is mounted in a sliding manner on the at least one translation spindle. Similarly, an endstop, for example washers, may be provided on the at least one translation spindle so as to limit the travel of the attachment support.

The retaining arm may comprise at least one retaining opening through which the at least one translation spindle can pass.

The attachment support may have a first face to which the connecting device is attached and a second face, facing away from the first face, from which there extends at least one wall comprising at least one wall opening through which the at least one translation spindle can pass.

The at least one translation spindle may extend substantially parallel to the longitudinal axis of the attachment support.

The retaining arm may comprise a first retaining opening and a second retaining opening through which, respectively, a first translation spindle and a second translation spindle can pass.

The attachment support may have a first face to which the connecting device is attached and a second face, facing away from the first face, from which there extend a first wall and a second wall which are located on either side of the retaining arm, the first wall comprising first and second wall openings, and the second wall comprising third and fourth wall openings, wherein a first translation spindle can pass through the first and third wall openings, and a second translation spindle can pass through the second and fourth wall openings.

Advantageously, the presence of the retaining arm between the first and second walls may make it possible to limit the movement of the connecting device with respect to the structural element, in particular along the longitudinal axis of the rigid structure.

On one hand, the first wall opening, the first retaining opening and the third wall opening may be in alignment. On the other hand, the second wall opening, the second retaining opening and the fourth wall opening may be in alignment.

The first translation spindle and the second translation spindle may be substantially mutually parallel.

The translation spindle or spindles may for example take the form of a screw, comprising a screw head and a nut, which are located in particular on either side of the first and second walls.

The first wall and the second wall may be substantially mutually parallel.

The wing portion may be an attachment pylon intended to be used to carry a jet engine for an aircraft.

The attachment pylon may comprise a structural element in the form of a rear secondary structure in which is located the connecting device between the rigid structure and the flexible structure.

The rigid structure and the flexible structure may respectively be formed by a rigid hydraulic duct and a flexible hydraulic duct.

The connecting device may be a fire shut-off valve.

The fire shut-off valve may be attached, at one of its ends, to the rigid hydraulic duct in an inelastic manner and, at its other end, to the flexible hydraulic duct.

The rigid hydraulic duct may be a hydraulic fluid aspiration duct.

Advantageously, the at least one translation spindle may extend along the longitudinal axis of the rigid structure, in particular the rigid hydraulic duct, so as to permit a movement of the connecting device, in particular the fire shut-off valve, in the direction of this longitudinal axis.

The disclosure also relates, according to another of its aspects, to an engine assembly for an aircraft, wherein it comprises a wing portion as defined above and a jet engine carried by the wing portion.

The wing portion may be an attachment pylon carrying the jet engine.

Furthermore, the disclosure also relates, according to another of its aspects, to an aircraft, wherein it comprises at least one wing portion as defined above or an engine assembly as defined above.

BRIEF DESCRIPTION OF THE DRAWINGS

The present disclosure may be better understood upon reading the following detailed description of a non-limiting exemplary embodiment of the disclosure, and upon examining the schematic and partial figures of the appended drawing, in which.

In all of these figures, identical references may designate identical or similar elements.

Moreover, the various portions represented in the figures are not necessarily shown to the same scale; this is for the sake of clarity of the figures.

DETAILED DESCRIPTION

Figure 1:
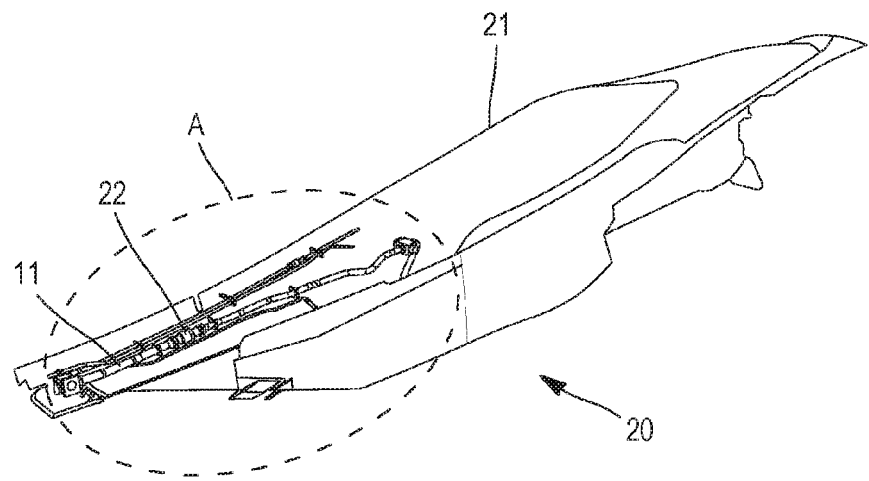
FIG. 1 represents, in perspective, an example of an attachment pylon for a jet engine of an aircraft.
Figure 2:
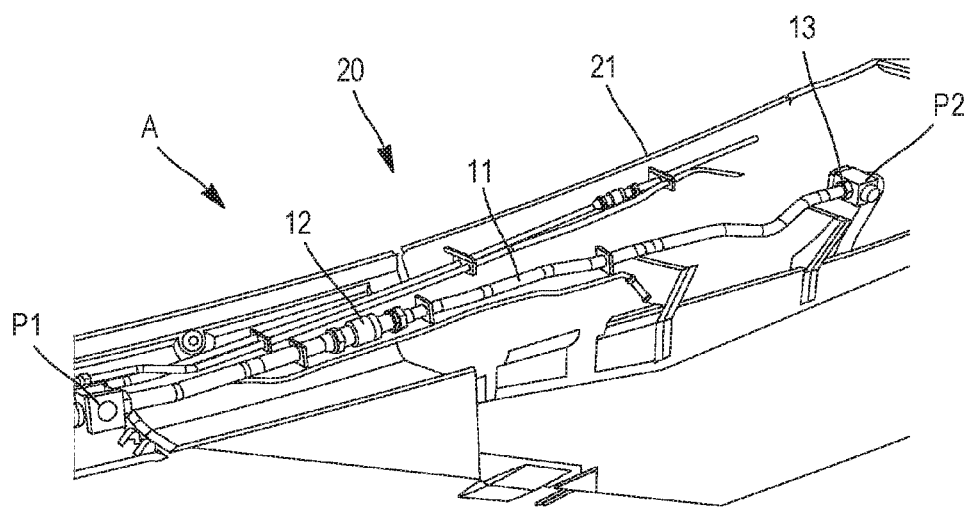
FIG. 2 is an enlarged view of region A of FIG. 1.

FIGS. 1 and 2 have already been described above in the section relating to the prior art.

In all the remainder of the description, an example of a wing portion is disclosed in the form of an attachment pylon 20 for a jet engine of an aircraft. Moreover, the structural element of this wing portion in the form of an attachment pylon 20 comprises the rear secondary structure 21 of the attachment pylon. Furthermore, the connecting device between a rigid structure and a flexible structure corresponds, in this example, to a fire shut-off valve 13 positioned between a rigid hydraulic aspiration duct 11 and a flexible hydraulic duct 16.

Of course, the disclosure is in no way limited to this exemplary embodiment. In particular, it may be applied to the principle for attaching any type of connecting device which is located between a rigid structure and a flexible structure, on an aircraft wing.

Figure 3:
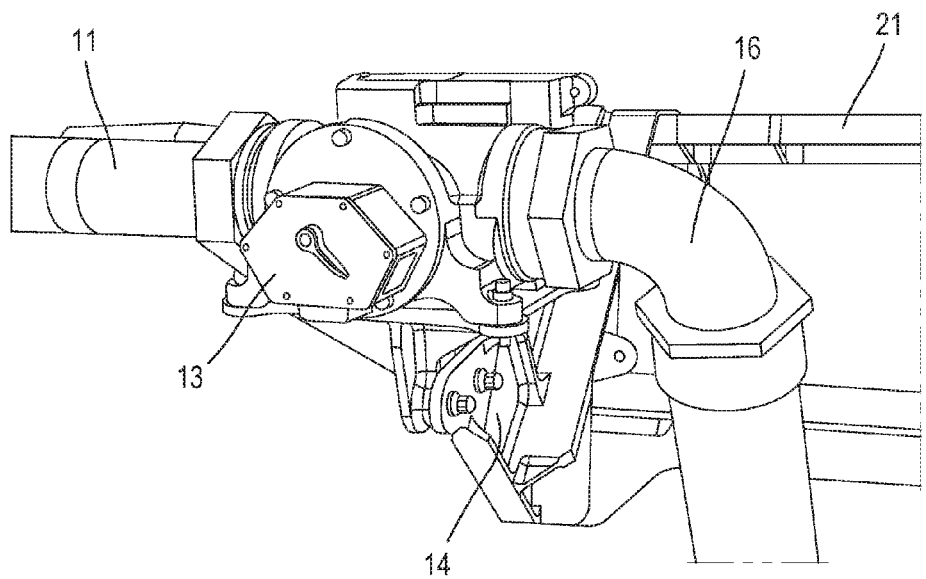
FIG. 3 represents, in perspective, the principle according to the prior art for attaching a fire shut-off valve to the structure of an attachment pylon for a jet engine of an aircraft.

Thus, FIG. 3 shows, in perspective, an example of the principle according to the prior art for attaching a connecting device 13, in particular a fire shut-off valve 13, to a structural element 21, in particular the rear secondary structure 21, of a wing portion 20, in particular an attachment pylon 20 for a jet engine of an aircraft.

As shown in this FIG. 3, the fire shut-off valve 13 is positioned between a rigid hydraulic fluid aspiration duct 11 and a bent flexible hydraulic duct 16, wherein the fire shut-off valve 13 allows, in an open position, the hydraulic fluid to circulate in the aspiration duct 11 and prevents, in a closed position, the hydraulic fluid from circulating in the aspiration duct 11.

According to this embodiment of the prior art, the fire shut-off valve 13 is secured to the rear secondary structure 21 via the intermediary of an attachment support 14 which prevents any flexibility between the rear secondary structure 21 and the fire shut-off valve 13. More precisely, the attachment support 14 is provided so as to prevent the fire shut-off valve 13 from moving relative to the rear secondary structure 21. The fire shut-off valve 13 is in reality used for immobilizing the aspiration duct 11 with respect to the rear secondary structure 21.

Thus, this manner of attaching the fire shut-off valve 13, connecting the aspiration duct 11 to the flexible duct 16, does not provide the flexibility necessary for absorbing the assembly tolerances and for compensating for the variations of movement which may arise. Therefore, the aspiration duct 11 must be equipped with a sliding union connector 12, as described with reference to FIG. 2, which then entails the abovementioned drawbacks, and in particular the appearance of leaks.

An exemplary embodiment of the disclosure will now be described with reference to FIGS. 4 and 5.

Figure 4:
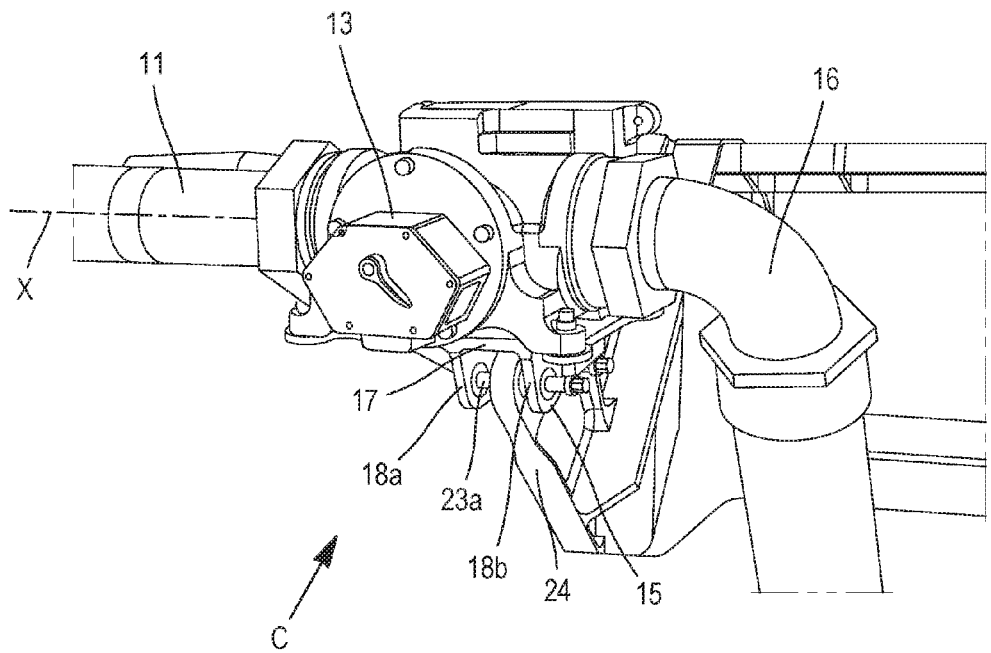
FIG. 4 represents, in perspective, the principle according to the disclosure for attaching a connecting device to a structural element of an aircraft wing portion.
Figure 5:
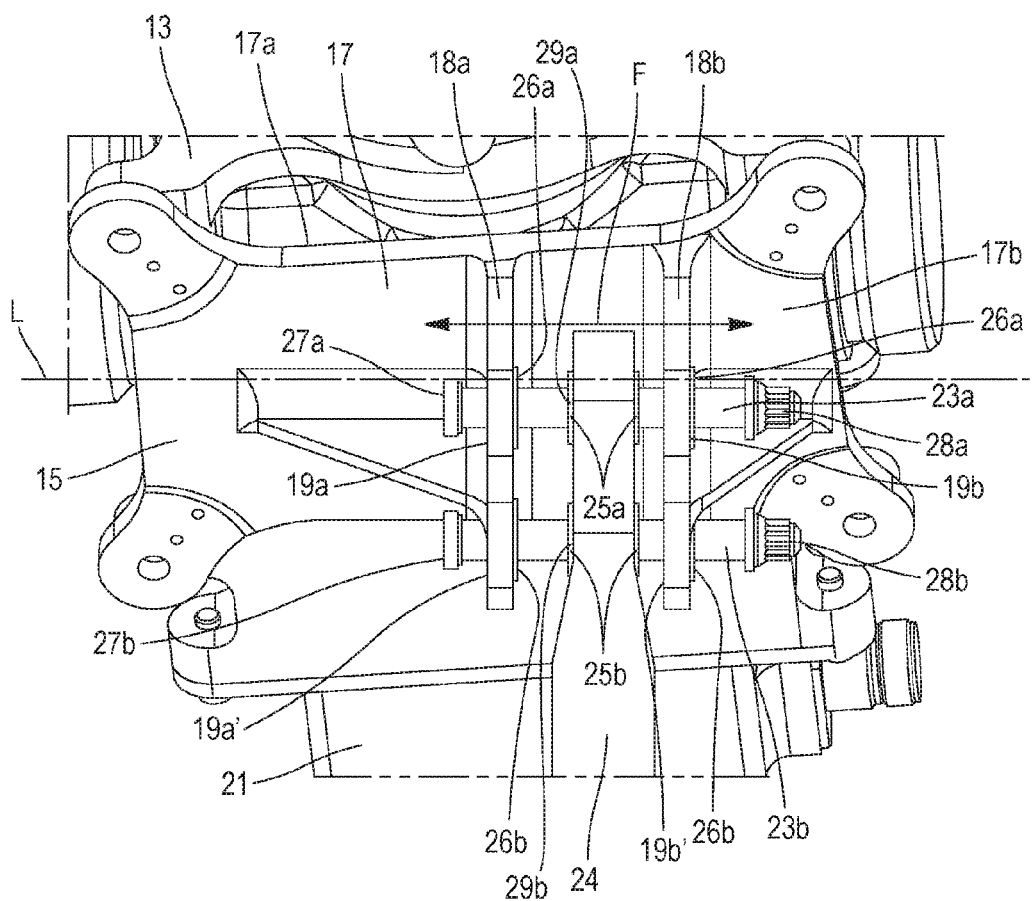
FIG. 5 is an enlarged and simplified view from the viewing angle represented by the arrow C of FIG. 4.

FIG. 4 represents, in perspective, the principle according to the disclosure for attaching a fire shut-off valve 13 to the rear secondary structure 21 of an attachment pylon 20 for a jet engine of an aircraft, and FIG. 5 is an enlarged and simplified view from a different angle represented by the arrow C in FIG. 4.

The fire shut-off valve 13 is mounted between the aspiration duct 11 and the bent flexible duct 16, as mentioned previously with reference to FIG. 3.

In accordance with the disclosure, the fire shut-off valve 13 is attached to the rear secondary structure 21 via the intermediary of an attachment support 15, mounted in translation on the rear secondary structure 21 by first 23a and second 23b translation spindles, such that the fire shut-off valve 13 is able to move with respect to the rear secondary structure 21. In particular, the attachment support 15 comprises walls 18a, 18b, which are described in detail below, which allow the fire shut-off valve 13 to move in translation with respect to the rear secondary structure 21.

FIG. 5 represents, in greater detail, the embodiment of the attachment support 15. As shown in this figure, for example, the attachment support 15 takes the form of a plate, and comprises a first face 17a to which the fire shut-off valve 13 is attached, and a second face 17b, facing away from the first face 17a, from which a first wall 18a and a second wall 18b extend, which walls are substantially mutually parallel.

Moreover, the rear secondary structure 21 comprises a retaining arm 24 to which the attachment support 15 is mounted in translation.

More specifically, the attachment support 15 is mounted in translation on the retaining arm 24 via the intermediary of the first translation spindle 23a and the second translation spindle 23b. The first translation spindle 23a and the second translation spindle 23b are advantageously substantially mutually parallel, and substantially parallel to the longitudinal axis L of the attachment support 15.

In this exemplary embodiment, the attachment support 15 is mounted in a sliding manner on the first translation spindle 23a and the second translation spindle 23b, such that the retaining arm is attached non-removably to the first translation spindle 23a and the second translation spindle 23b. Alternatively, it would of course be possible to provide that the retaining arm 24 be mounted in a sliding manner on the first translation spindle 23a and the second translation spindle 23b, and that the attachment support 15 be attached non-removably to these first 23a and second 23b translation spindles.

The manner of mounting the attachment support 15 such that it can move in translation with respect to the retaining arm 24 of the rear secondary structure 21 is described below.

To that end, the retaining arm 24 comprises a first retaining opening 29a through which the first translation spindle 23a can pass, and a second retaining opening 29b through which the second translation spindle 23b can pass.

Moreover, the first wall 18a and the second wall 18b are located on either side of the retaining arm 24. The first wall 18a comprises first 19a and second 19a' wall openings. Similarly, the second wall 18b comprises third 19b and fourth 19b' wall openings. The first translation spindle 23a can pass through the first 19a and third 19b wall openings. Similarly, the second translation spindle 23b can pass through the second 19a' and fourth 19b' wall openings.

In this manner, the first wall opening 19a, the first retaining opening 29a and the third wall opening 19b face one another or are in alignment, and the second wall opening 19a', the second retaining opening 29b and the fourth wall opening 19b' also face one another or are in alignment.

The first 18a and second 18b walls may be similar to one another, comprising in particular wall openings having the same dimensions.

In order that the attachment support 15 can be mounted such that it is able to move in translation relative to the retaining arm 24, such that only the attachment support 15 is able to slide relative to the assembly formed by the retaining arm 24 and the first 23a and second 23b translation spindles, it is provided to use endstops 25a, 25b, 26a, 26b at the first 23a and second 23b translation spindles. These endstops may correspond to washers (as in the described example), or shouldered bushings which can simultaneously act as guides and endstops.

Thus, washers 26a and washers 26b are respectively provided on the first translation spindle 23a and the second translation spindle 23b so as to serve as endstops when the first 18a and second 18b walls of the attachment support 15 move relative to the first 23a and second 23b translation spindles.

Moreover, it is also provided to have washers 25a arranged on either side of the retaining arm 24 on the first translation spindle 23a, and washers 25b arranged on either side of the retaining arm 24 on the second translation spindle 23b. The retaining arm 24 and the first 23a and second 23b translation spindles are thus secured so as to be fixed relative to one another.

Furthermore, the first 23a and second 23b translation spindles may take the form of a screw. In particular, the first translation spindle 23a comprises a head 27a and a nut 28a such that it can be mounted on either side of the first 18a and second 18b walls. Similarly, the second translation spindle 23b comprises a head 27b and a nut 28b such that it can be mounted on either side of the first 18a and second 18b walls. The presence of the heads 27a, 27b and of the nuts 28a, 28b may, where relevant, be determined so as to permit either the translation spindles 23a, 23b to be secured to the first 18a and second 18b walls and the translation spindles 23a, 23b to be free to move in translation in the openings 29a, 29b of the retaining arm 24, or the translation spindles 23a, 23b to be secured to the retaining arm 24 and the translation spindles 23a, 23b to be free to move in translation relative to the first 18a and second 18b walls.

By virtue of the attachment support 15 being thus mounted free to move in translation relative to the retaining arm 24, it is possible to obtain a possibility of movement between the fire shut-off valve 13 and the rear secondary structure 21, which may take place in the two senses represented by the arrow F in FIG. 5, wherein the amplitude of the movement depends on the endstop washers 26a and 26b. This movement may advantageously take place substantially parallel to the longitudinal axis X of the aspiration duct 11, shown in FIG. 4.

Moreover, since the fire shut-off valve 13 is attached, at the opposite end from that to which the aspiration duct 11 is inelastically attached, to the bent duct 16 which is flexible, the latter permits this relative movement of the fire shut-off valve 13 with respect to the rear secondary structure 21.

This relative movement, symbolized by the arrow F in FIG. 5, may furthermore have an amplitude which will be determined by calculation so as to be able to compensate for the assembly tolerances and the difference in thermal expansion, during flight, between the attachment pylon 20 and the wing.

The disclosure may thus advantageously allow the sliding union connectors 12, previously used in the prior art on the low-pressure hydraulic ducts 11, to be replaced with fire shut-off valves 13 which are able to move relative to the rear secondary structure 21 of the attachment pylon 20, in accordance with the principle of the disclosure.

Of course, the disclosure is not limited to the exemplary embodiment just described. Various modifications thereto may be implemented by one skilled in the art.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A wing portion of an aircraft comprising a connecting device between a rigid duct and a flexible duct, the connecting device being attached to a structural element of the wing portion via an intermediary of an attachment support, wherein the attachment support is mounted in translation on a retaining arm of the structural element by at least one translation spindle, and wherein either the attachment support is attached non-removably to the at least one translation spindle, the assembly thus formed by the attachment support and the at least one translation spindle being able to slide with respect to the retaining arm, or the retaining arm is attached non-removably to the at least one translation spindle, the assembly thus formed by the retaining arm and the at least one translation spindle being able to slide with respect to the attachment support.

2. The wing portion according to claim 1, wherein the retaining arm comprises at least one retaining opening through which the at least one translation spindle can pass.

3. The wing portion according to claim 1, wherein the attachment support has a first face to which the connecting device is attached and a second face, facing away from the first face, from which there extends at least one wall comprising at least one wall opening through which the at least one translation spindle can pass.

4. The wing portion according to claim 1, wherein the at least one translation spindle extends substantially parallel to the longitudinal axis of the attachment support.

5. The wing portion according to claim 1, wherein the retaining arm comprises a first retaining opening and a second retaining opening through which, respectively, a first translation spindle and a second translation spindle can pass.

6. The wing portion according to claim 5, wherein the attachment support has a first face to which the connecting device is attached and a second face, facing away from the first face, from which there extend a first wall and a second wall which are located on either side of the retaining arm, the first wall comprising first and second wall openings, and the second wall comprising third and fourth wall openings, wherein a first translation spindle can pass through the first and third wall openings, and a second translation spindle can pass through the second and fourth wall openings.

7. The wing portion according to claim 6, wherein the first wall opening, the first retaining opening and the third wall opening are in alignment and the second wall opening, the second retaining opening and the fourth wall opening are in alignment.

8. The wing portion according to claim 6, wherein the first wall and the second wall are substantially mutually parallel.

9. The wing portion according to claim 5, wherein the first translation spindle and the second translation spindle are substantially mutually parallel.

10. The wing portion according to claim 1, wherein the wing portion comprises an attachment pylon intended to be used to carry a jet engine for an aircraft.

11. An engine assembly for an aircraftcomprising a wing portion according to claim 10 and a jet engine carried by the wing portion.

* * * * *